US009060191B2

(12) United States Patent
Chhaochharia et al.

(10) Patent No.: US 9,060,191 B2
(45) Date of Patent: Jun. 16, 2015

(54) FULL-REFERENCE COMPUTATION OF MOBILE CONTENT QUALITY OF EXPERIENCE IN REAL-TIME

(75) Inventors: Nikhil Chhaochharia, Bangalore (IN); Hariharan Ramasangu, Bangalore (IN); George Paulose Koomullil, Bangalore (IN); Ashish Tulsian, Bangalore (IN)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/378,993

(22) PCT Filed: Jun. 20, 2011

(86) PCT No.: PCT/IB2011/052687
§ 371 (c)(1),
(2), (4) Date: Feb. 6, 2013

(87) PCT Pub. No.: WO2012/143764
PCT Pub. Date: Oct. 26, 2012

(65) Prior Publication Data
US 2013/0133011 A1    May 23, 2013

(30) Foreign Application Priority Data
Apr. 20, 2011   (IN) .......................... 1369/CHE/2011

(51) Int. Cl.
*H04N 7/173* (2011.01)
*H04N 21/24* (2011.01)
(Continued)

(52) U.S. Cl.
CPC ....... *H04N 21/2402* (2013.01); *H04N 21/2408* (2013.01); *H04L 47/14* (2013.01); *H04L 47/24* (2013.01); *H04L 47/25* (2013.01); *H04W 24/06* (2013.01)

(58) Field of Classification Search
CPC ............ H04N 21/234; H04N 21/2343; H04N 21/234309; H04N 21/234381; H04N 21/234363; H04N 21/234372; H04N 21/24; H04N 21/2402; H04N 21/2408; H04N 21/258; H04N 21/25833; H04N 21/442; H04N 21/44209; H04N 21/44245; H04N 21/647; H04N 21/6473; H04N 21/64723; H04N 21/64738; H04N 21/658
USPC ............................................. 725/95, 96, 107
See application file for complete search history.

(56) References Cited

U.S. PATENT DOCUMENTS

| 5,635,982 A | 6/1997 | Zhang et al. |
| 6,453,315 B1 | 9/2002 | Weissman et al. |

(Continued)

FOREIGN PATENT DOCUMENTS

| JP | 11069325 | 3/1999 |
| JP | 2002344913 | 11/2002 |

(Continued)

OTHER PUBLICATIONS

ITU-T J.247, Series J:Cable Networks and Transmission of Television, Sound Programme and other Multimedia signals, measurement of the quality of service, "Objective perceptual multimedia video quality measurement in the presence of a full reference" (Aug. 2008).*

(Continued)

*Primary Examiner* — James R Sheleheda
(74) *Attorney, Agent, or Firm* — Turk IP Law, LLC

(57) ABSTRACT

Technologies are generally described for Quality of Experience (QoE) computation in a wireless content transmission environment. Portions of audio and/or video content transmitted to user devices may be selected by a service provider/content provider/user device and transmitted back from the user device for real-time QoE computation. Transmission quality may be adjusted based on the real-time QoE computations. Alternatively, selected portions of the content may be stored for subsequent computation and improvement. Selected portions of the data may be frames marked as such and reference frames may be selected based on the marked frames.

20 Claims, 10 Drawing Sheets

(51) Int. Cl.
*H04L 12/851* (2013.01)
*H04L 12/825* (2013.01)
*H04W 24/06* (2009.01)
*H04L 12/801* (2013.01)

(56) References Cited

U.S. PATENT DOCUMENTS

| | | | |
|---|---|---|---|
| 6,865,374 B2* | 3/2005 | Kalluri | 455/65 |
| 7,599,307 B2* | 10/2009 | Seckin et al. | 370/252 |
| 7,729,381 B2* | 6/2010 | Savoor et al. | 370/474 |
| 8,270,419 B2* | 9/2012 | Liva et al. | 370/401 |
| 8,347,344 B2* | 1/2013 | Makhija et al. | 725/116 |
| 8,401,067 B2* | 3/2013 | Kim et al. | 375/240 |
| 8,424,049 B2* | 4/2013 | Skelly | 725/107 |
| 8,644,316 B2* | 2/2014 | Savoor et al. | 370/392 |
| 2004/0078575 A1* | 4/2004 | Morten et al. | 713/176 |
| 2005/0157753 A1* | 7/2005 | Mayer | 370/468 |
| 2005/0204052 A1 | 9/2005 | Wang et al. | |
| 2008/0025400 A1* | 1/2008 | Sugimoto et al. | 375/240.16 |
| 2008/0066113 A1 | 3/2008 | Skelly | |
| 2008/0310838 A1* | 12/2008 | Blauvelt | 398/43 |
| 2009/0025052 A1* | 1/2009 | Schlack et al. | 725/116 |
| 2009/0154368 A1* | 6/2009 | Kim et al. | 370/252 |
| 2010/0046631 A1 | 2/2010 | Raveendran | |
| 2011/0119668 A1 | 5/2011 | Calder et al. | |
| 2011/0122778 A1* | 5/2011 | Bloom | 370/252 |
| 2011/0145499 A1 | 6/2011 | Ananthanarayanan et al. | |
| 2011/0211464 A1* | 9/2011 | Chetlur et al. | 370/252 |
| 2011/0255589 A1* | 10/2011 | Saunders et al. | 375/240.01 |
| 2011/0271307 A1* | 11/2011 | Post et al. | 725/70 |
| 2012/0004958 A1* | 1/2012 | Bloom et al. | 705/14.4 |
| 2012/0013748 A1* | 1/2012 | Stanwood et al. | 348/192 |
| 2012/0077466 A1* | 3/2012 | O'Mahony et al. | 455/414.1 |
| 2013/0009981 A1* | 1/2013 | Kruglick | 345/619 |
| 2013/0205356 A1* | 8/2013 | Skelly | 725/114 |
| 2013/0298170 A1* | 11/2013 | ElArabawy et al. | 725/62 |
| 2013/0301810 A1* | 11/2013 | Dunne et al. | 379/32.01 |
| 2014/0033242 A1* | 1/2014 | Rao et al. | 725/14 |

FOREIGN PATENT DOCUMENTS

| | | | |
|---|---|---|---|
| JP | 2010518782 A | | 5/2010 |
| WO | 2006020834 A1 | | 4/2006 |
| WO | 2008024654 A2 | | 2/2008 |
| WO | WO 2012143764 A1 | * | 10/2012 |

OTHER PUBLICATIONS

International Telecommunications Union Recommendation J.144 Rev. 1, Jan. 2004 ("J.144").*

PCT/IB11/52687 International Search Report and Written Opinion mailed Jun. 20, 2011.

Kuipers et al., "Techniques for Measuring Quality of Experience", Delft University of Technology, P.O. Box 5031, 2600 GA Delft, The Netherlands, F.A.Kuipers@tudelft.nl; TNO, Brassersplein 2, 2612 CT, Delft, The Netherlands robert.kooij@tno.nl; Alcatel-Lucent Bell NV, Copernicuslaan 50, 2018 Antwerp, Belgium; danny.de_vleeschauwer@alcatel-lucent.com; Netlab, Acreo AB, Kista, Sweden Kjell.Brunnstrom@acreo.se. 12 Pages.

Aguiar E. S. et al, "Trends and Challenges for Quality of Service and Quality of Experience for Wireless Mesh Networks", Source (Wireless Mesh Networks), Publisher (InTech), Jan. 2011 See the whole document in particular the abstract, figure 1, sections 2.2,2.2.1, and 2.2.2, pp. 1-58.

d'Orazio et al., "Semantic caching for pervasive grids", Université Blaise Pascal, Clermont-Ferrand LIMOS,Campus des Cézeaux, B.P. 125, 63173 Aubièere, France, 7 Pages.

Andrew Clearwater, The New Ontologies: The Effect of Copyright Protection on Public Scientific Data Sharing Using Semantic Web Ontologies, 10 J. Marshall Rev. Intell. Prop. L. 182 (2010).

Wuhib et al., Gossip-based Resource Management for Cloud Environments, 6th International Conference on Network and Service Management, Niagara Falls, Ontario, Canada, Oct. 25-29, 2010.

Matos et al., CLON: Overlay Networks and Gossip Protocols for Cloud Environments, Universidade do Minho, Braga, Portugal.

Deshendran Moodley, Ontology Driven Multi-Agent Systems: An Architecture for Sensor Web Applications. School of Computer Science, Faculty of Science and Agriculture, University of KwaZulu-Natal, Durban, South Africa, Dec. 2009.

Martin et al., Improving the Performance of Semantic Web Applications with SPARQL Query Result Caching, Universitat Leipzig, Institut fur Informatik, Augustusplatz 10-11, D-04109 Leipzig, Germany.

Hakimpour,et al., Data Processing in Space, Time and Semantics Dimensions, LSDIS Lab, University of Georgia, Athens, GA 30602, USA.

Kagal et al., Using Semantic Web Technologies for Policy Management on the Web, Massachusetts Institute of Technology Computer Science and Artificial Intelligence Lab, Cambridge, MA 02139.

DiaLogic "Quality of Experience for Mobile Video Users," White Paper, pp. 1-12 (Dec. 2009).

Vaananen, O., "QOSMETER—Measurement solution for location-dependent mobile network performance," pp. 1-7 (Jul. 2009).

Venkataraman, M., et al., "Towards a Video QoE Definition in Converged Networks," Second International Conference on Digital Telecommunications, pp. 1-6 (Jul. 1-5, 2007).

Garcia et al, "A QoE Management System for Ubiquitous IPTV Devices," IEEE Computing Society, 2009, pp. 147-152, 2009 Third International Conference on Mobile Ubiquitous Computing, Systems, Services and Technologies.

Muntean et al. "User Quality of Experience-Aware Multimedia Streaming over Wireless Home Area Network," IEEE, 2007, 644-648.

Wang et al., "A New Approach Measuring Users' QoE in the IPTV." IEEE Computing Society, 2009, pp. 453-456, 2009 Pacific-Asia Conference n Circuits, Communications and Systems.

* cited by examiner

FULL-REFERENCE COMPUTATION OF MOBILE CONTENT QUALITY OF EXPERIENCE IN REAL-TIME

CROSS REFERENCE TO RELATED APPLICATIONS

The present application is the National Stage filing under 35 U.S.C. §371 of PCT application Ser. No. PCT/IB11/52687 filed on Jun. 20, 2011, claims priority under 35 U.S.C. §119 (a) and (b) to Indian Application No. 1369/CHE/2011, filed on Apr. 20, 2011. The disclosures of the PCT Application and Indian Application are hereby incorporated by reference in their entireties.

BACKGROUND

Unless otherwise indicated herein, the materials described in this section are not prior art to the claims in this application and are not admitted to be prior art by inclusion in this section.

Videos provided through wireless networks such as cellular networks are common in daily usage through mobile or stationary devices like smart phones, desktop computers, and similar ones. Such videos and/or audio content may be directly provided by a service provider (e.g., a cellular service provider) or from a third party content provider (e.g., a search engine, a content creator, etc.) through the wireless network service provider. Due to high throughput requirements and device mobility, Quality of Experience (QoE) of wirelessly provided content may suffer. Typically, service providers lack accurate QoE computations available in real-time.

The present disclosure acknowledges that there are several limitations with known techniques for QoE computation in mobile content transmission. Full-reference or reference-free QoE computation of video transmission are some of the commonly used approaches. However, reference-free models do not have high accuracy. Full-reference models can be computationally expensive/intensive and, therefore, not practical in real-time. Furthermore, transmitting reference video content to a mobile device for full-reference QoE computation may be impractical due to high download bandwidth requirements in a mobile environment.

SUMMARY

According to some examples, the present disclosure describes a method for quiet period management in secondary networks. The method may include determining quality of experience (QoE) in a wireless system. The method may include transmitting data to be played back at one or more user devices, receiving one or more selected portions of the transmitted data from a user device, and performing QoE computation using the received portions of the transmitted data.

According to other examples, the present disclosure describes another method for enabling computation of quality of experience (QoE) in a wireless system. The other method may include receiving data to be played back, determining a portion of the received data to be transmitted to one of a service provider or content provider for QoE computation, capturing the portion of the data to be transmitted to one of the service provider or content provider, and transmitting the portion of the data to one of the service provider or content provider.

According to yet other examples, the present disclosure describes a server providing an audio/video transmission service with quality of experience (QoE) computation over a wireless network. The server may include a communication module adapted to communicate wirelessly with one or more user devices, a memory adapted to store instructions, and a processor coupled to the communication module and the memory. The processor may be adapted to transmit data to be played back at one or more user devices, receive one or more selected portions of the transmitted data from a user device and perform QoE computation based on the received portions of the transmitted data.

According to further examples, the present disclosure describes a computing device for receiving an audio/video transmission with quality of experience (QoE) computation over a wireless network. The computing device may include a memory adapted to store instructions; and a processor coupled to the communication module and the memory. The processor may be adapted to receive data to be played back, determine a portion of the received data to be transmitted to the service provider for QoE computation, capture the portion of the data to be transmitted to the service provider, and transmit the portion of the data to the service provider.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The below described and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
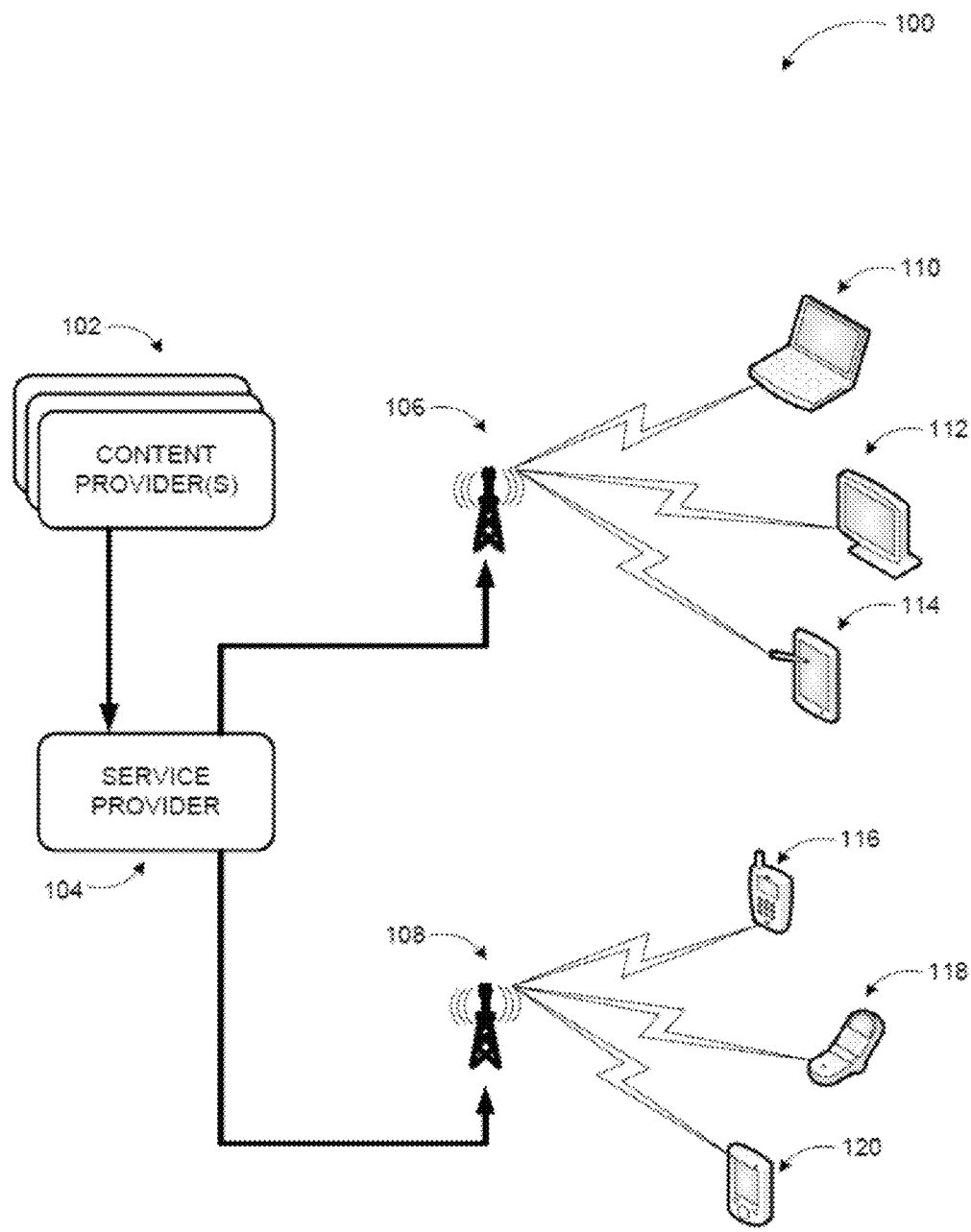
FIG. 1 is a diagram of an illustrative example system transmitting video content to a variety of user devices.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to full reference quality of experience computation for transmitted content in wireless environments.

Briefly stated, portions of audio and/or video content transmitted to user devices may be selected by a service provider/content provider/user device and transmitted back for real-time Quality of Experience (QoE) computation. Transmission quality may be adjusted based on the real-time QoE computations. Alternatively, selected portions of the content may be stored for subsequent computation and improvement. Selected portions of the data may be frames marked as such and reference frames may be selected based on the marked frames.

FIG. 1 is a diagram of an illustrative example system transmitting video content to a variety of user devices. While video transmission is used in example descriptions herein, embodiments may be implemented in systems transmitting video and/or audio content over wireless networks to mobile and stationary user devices.

Diagram 100 shows a service provider 104 receiving content (audio/video) from one or more content providers 102. Content providers 102 may be part of the service provider or separate entities. For example, service provider 104 may be a cellular service provider, which may generate some of the content itself. Other content may be received from third party content generators. Service provider 104 may facilitate communications between various user devices and/or transmit content to the user devices over one or more networks. The transmission may involve transmission towers, access points, and comparable transceivers (106, 108).

In the example system of diagram 100, transceivers 106 and 108 communicate wirelessly with user devices such as laptop computer 110, desktop computer 112, portable computer 114, smart phone 116, cellular phone 118, and wireless personal digital assistant (PDA) 120. User device may include other portable or stationary computing devices capable of wireless communication and playback of received content.

Simultaneous high bandwidth uplink and downlink are available in 3G cellular systems. However, the upload bandwidth is typically underutilized during mobile video services. A system according to some embodiments may transmit a selected set of video frames from mobile devices to the mobile operator utilizing available uplink bandwidth to compute full-reference QoE computation in real-time, while the rest of the data may be time and location stamped and archived. The computing power and storage of many mobile devices is comparable to those of conventional computers to store received videos and simultaneously decode and transmit back received video frames. Service providers may be able to compute QoEs of multiple mobile devices using cloud computing techniques QoE refers to a subjective measure of performance in a system in general. As used herein, QoE refers to the quality of received content by a user of a wireless system. For example, quality of received video or audio that can be measured by comparing originally transmitted content to the received content to determine a measure of degradation during transmission.

Mobile video viewership is heavily time-of-day and location dependent. When the upload channel is not under heavy usage (quiet periods), a background process may send back complete video frames to the service provider to perform an accurate post-facto, offline full-reference QoE computation according to other embodiments. The QoE computations may be correlated with instantaneous Quality of Service (QoS), location, a mobility of the user device, a signal strength at the user device, available memory at the user device, a processing capacity of the user device, and/or load on communication network, where the QoE computations are performed at one of a service provider transmitting the data or a content provider providing the data to the service provider.

The quiet periods may include low bandwidth demand periods. One approach to estimate the QoE is to compare the transmitted video with the received video. The transmitted data is available with the service provider and the received data is available at the mobile device. Thus, the QoE computation may include comparing each pixel of an unimpaired reference frame of a portion of the transmitted data with each pixel of a corresponding frame of the received portion of the transmitted data, and the method may further include performing at least one of spatial and/or temporal alignment between the unimpaired reference frame and the corresponding frame. A system according to embodiments provides the capability to determine real-time QoE values based on the available resources at real-time and more accurate QoE values as more resources become available.

Figure 2:
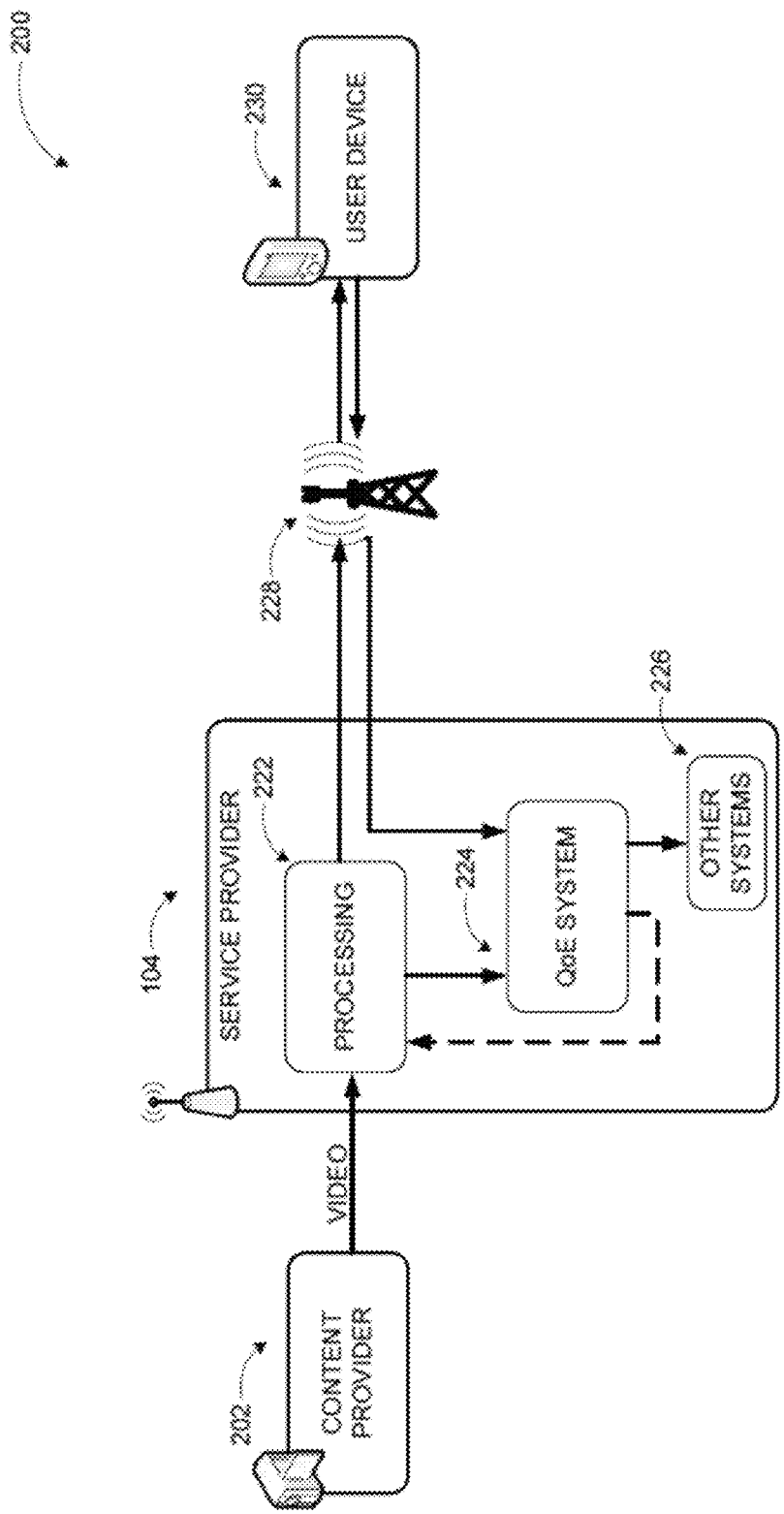
FIG. 2 conceptually illustrates an example video transmission system with full-reference QoE computation based on received video frames from a user device.

FIG. 2 conceptually illustrates an example video transmission system with full-reference QoE computation based on received video frames from a user device, arranged in accordance with at least some embodiments described herein.

Diagram 200 illustrates one example configuration of a system according to some embodiments, where video content is received from an external content provider 202 at a service provider 104 and QoE computations performed at the service provider 104. In other embodiments, content may be generated at the service provider 104, QoE computations may be performed at the content provider 202, or at least some of the QoE computations may be performed at user device 230.

According to an example scenario, service provider 104 (e.g., mobile operator) may receive video content from content provider 202, process the content at processing block 222 and transmit via transceiver 228 to user device 230. The processing may include selection of portions of the content for subsequent transmit-back by the user device 230 and marking of the selected portions to indicate to the user device. In other embodiments, user device 230 may select the portions of the content to be transmitted back and send them via transceiver 228 to QoE system 224 of service provider 104. If the portions are selected at the user device 230, QoE system 224 may receive corresponding reference portions from the processing block 222. QoE system 224 may provide results of the computations to processing block 222 such that quality of service parameters can be adjusted in real-time or for future transmissions. QoE system 224 may also provide the results to other systems 226 for statistical calculations, reporting, quality control, accounting. etc.

Figure 3:
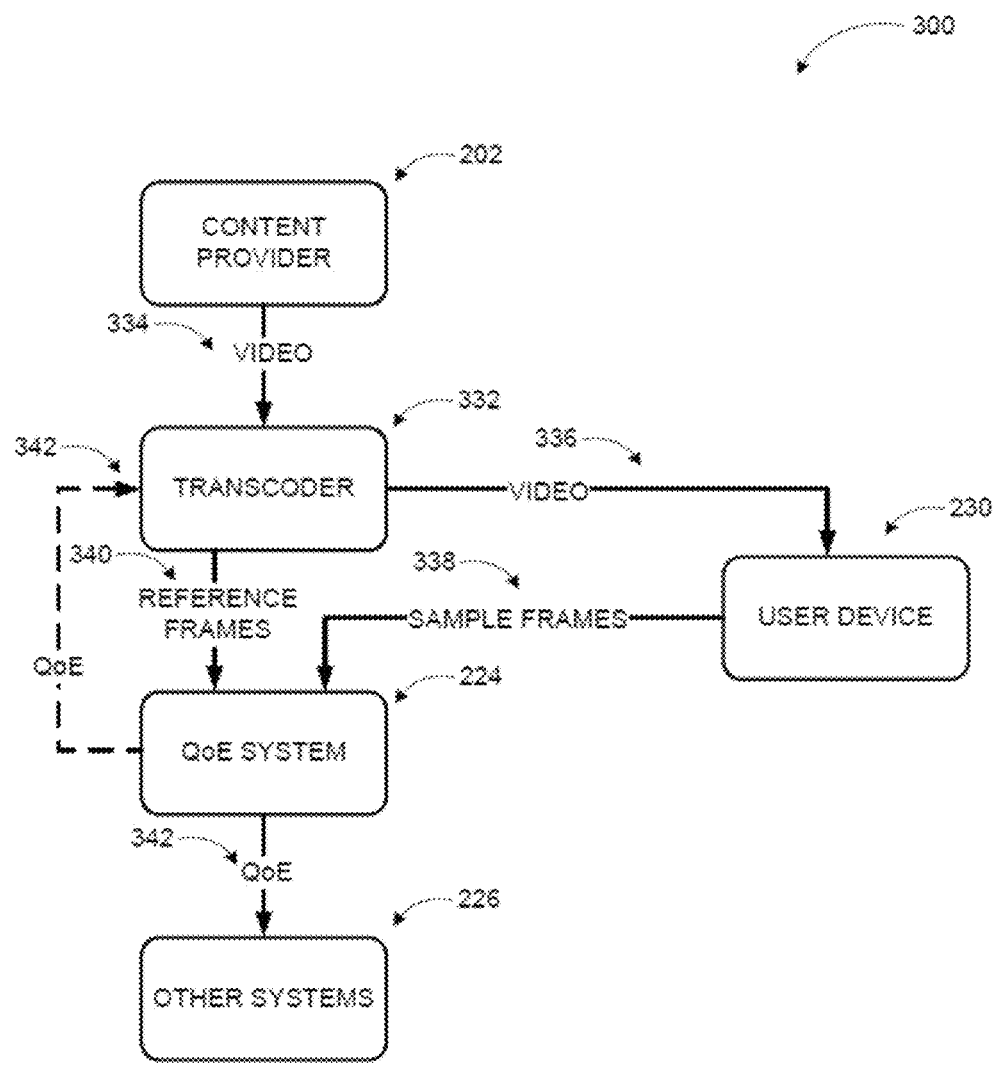
FIG. 3 illustrates major blocks of an example video transmission system with full-reference QoE computation based on received video frames from a user device.

FIG. 3 illustrates major blocks of an example video transmission system with full-reference QoE computation based on received video frames from a user device, arranged in accordance with at least some embodiments described herein.

In an example scenario shown in diagram 300, video content 334 may be received from content provider 202 at a transcoder 332 (service provider), which transcodes the video content and transmits (336) to its subscribers (user device 230). User device 230 at the subscriber's end displays the received content (video 336). User device 230 may select, at regular intervals or based on a predefined algorithm. a set of frames and the values of the pixels in those frames, and send the selected sample frames 338 back to the service provider (QoE system 224) using an available upload channel. QoE system 224 may perform QoE computations and provide results (342) to transcoder 332 for real-time adjustment of quality of service parameters. Alternatively, QoE results 342 may be provided to other systems such as a data store, where they may be stored for subsequent analysis and adjustment of QoS parameters.

If an upload channel is available, then sample frames 338 may be sent back to the QoE System 224 continuously and the largest possible number of frames that can be reliably transmitted through the upload channel in real-time may be sent back to the service provider. If the upload and download traffic is shared by the same channel, on the other hand, the user device 230 may send back the sequence of frames at the time of less-interesting periods like advertisement breaks or low-usage periods like late night. At these periods, the system may release extra bandwidth for upload purposes by downgrading the quality of transmissions.

The reference frames can be selected by the service provider (or content provider) according to some embodiments and marked as such. User device 230 may send those frames back to the service provider reducing the processing required at the device side. According to alternative embodiments, user device 230 may select the frames to be sent back based on the availability of uplink bandwidth, the processing power of the device, or similar parameters, and send the selected frames back to the operator identifying them as such (e.g., specifying frame numbers). The measurement system at the service provider may select the reference frames based on the received frame numbers.

While embodiments have been discussed above using specific examples, components, scenarios, and configurations in FIG. 1 through FIG. 3, they are intended to provide a general guideline to be used for QoE computations in mobile content transmission environments. These examples do not constitute a limitation on the embodiments, which may be implemented using other components, frame selection schemes, and configurations using the principles described herein. Furthermore, embodiments may be implemented for content received at stationary or vehicle mount devices, and applicable to audio, video, or comparable content.

Figure 4:
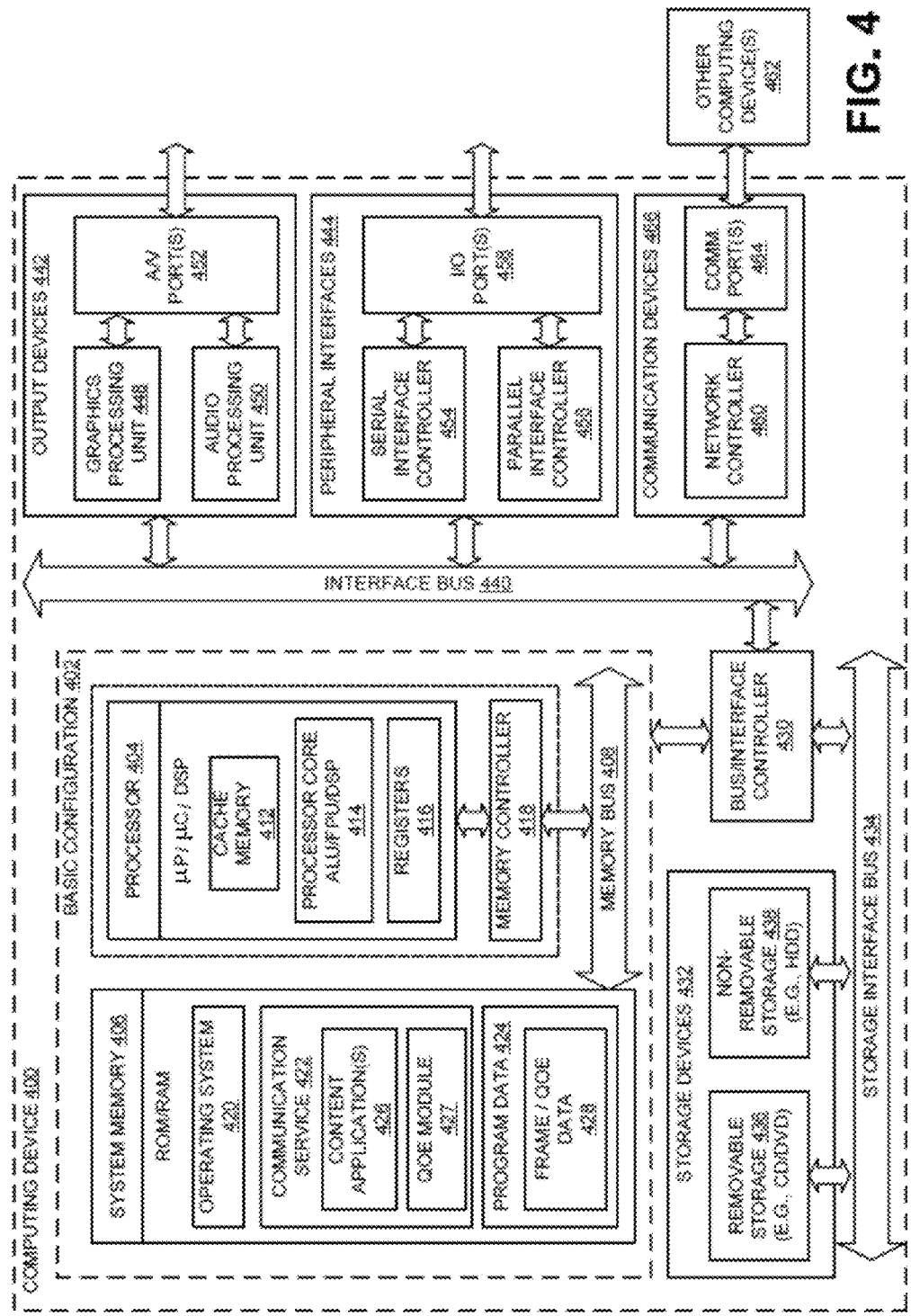
FIG. 4 illustrates a general purpose computing device, which may be used to implement full-reference computation of QoE in video transmission systems.

FIG. 4 illustrates a general purpose computing device, which may be used to implement full-reference computation of QoE in video transmission systems, arranged in accordance with at least some embodiments described herein. In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level cache memory 412, a processor core 414, and registers 416. Example processor core 414 may include an arithmetic logic unit (ALU), a floating point unit (FPU), a digital signal processing core (DSP Core), or any combination thereof. An example memory controller 418 may also be used with processor 404, or in some implementations memory controller 415 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, a communication service 422, one or more content applications 426, and QoE module 427. System memory 406 may further include program data 424 and frame/QoE data 428. Communication service 422 may provide audio/video content to users among other things. Content application(s) 426 may each be associated with a particular type of content to be provided to users. QoE module 427 may perform QoE computations based on portions of transmitted content received from user devices and adjust transmission parameters in real-time or subsequently. Frame/QoE data 428 may be stored in local or remote data stores for subsequent use. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is riot limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 666 to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 466 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a physical server, virtual server, a computing cloud, or a hybrid device that include any of the above functions. Computing device 400 may also be implemented as a personal computer including both laptop computer and non-laptop computer configurations. Moreover computing device 400 may be implemented as a networked system or as part of a general purpose or specialized server.

Networks for a networked system including computing device 600 may comprise any topology of servers, clients, switches, routers, modems, Internet service providers, and any appropriate communication media (e.g., wired or wireless communications). A system according to embodiments may have a static or dynamic network topology. The networks may include a secure network such as an enterprise network (e.g., a LAN, WAN, or WLAN), an unsecure network such as a wireless open network (e.g., IEEE 802.11 wireless networks), or a world-wide network such (e.g., the Internet). The networks may also comprise a plurality of distinct networks that are adapted to operate together. Such networks are configured to provide communication between the nodes described herein. By way of example, and not limitation, these networks may include wireless media such as acoustic, RF, infrared and other wireless media. Furthermore, the networks may be portions of the same network or separate networks.

Figure 5:
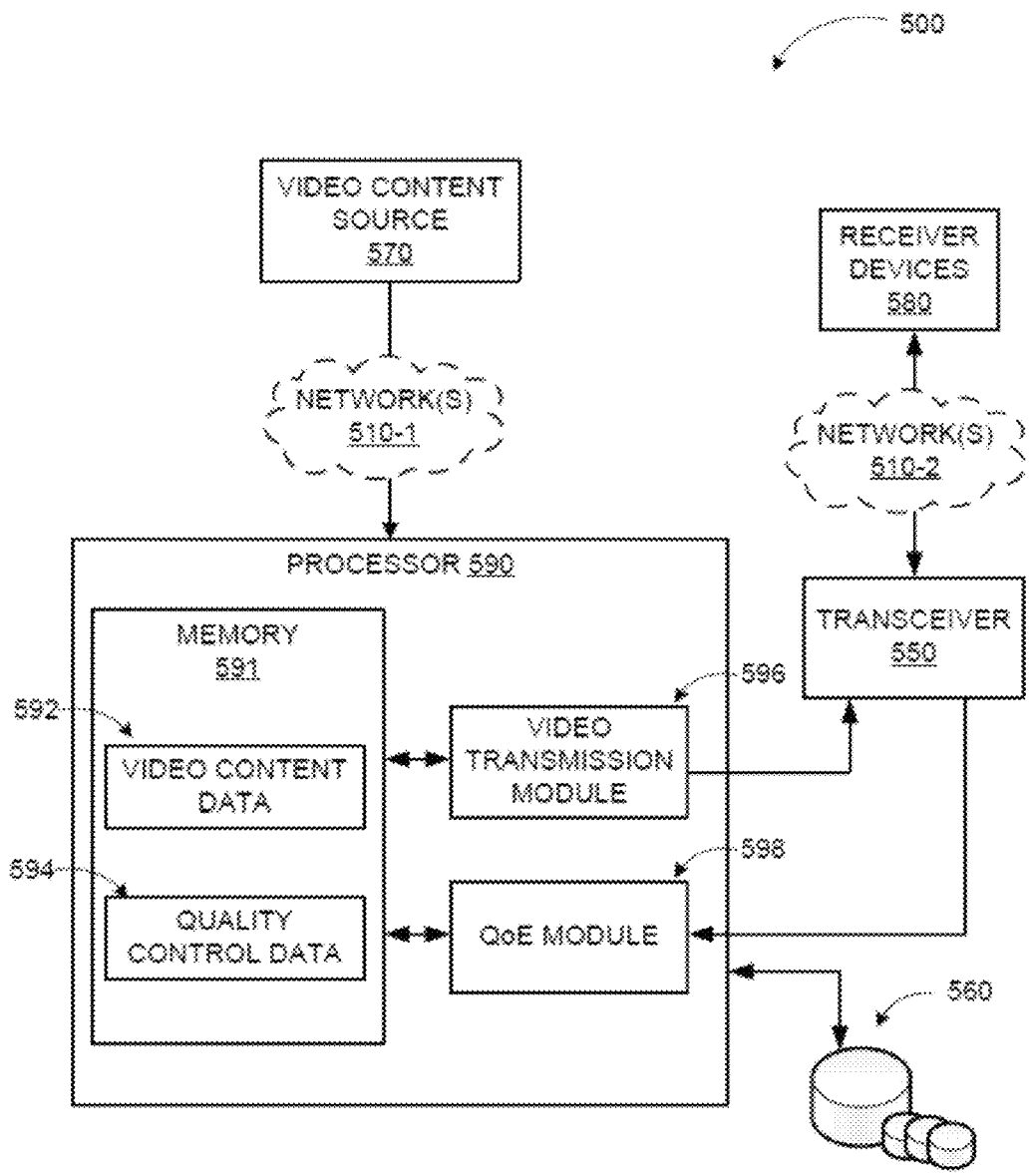
FIG. 5 illustrates a special purpose processor, which may be used to implement full-reference computation of QoE at a service provider for wireless video transmission.

FIG. 5 illustrates a special purpose processor, which may be used to implement full-reference computation of QoE at a service provider for wireless video transmission, arranged in accordance with at least some embodiments described herein. Processor 590 in diagram 500 may be part of a computing device (e.g., a server at a service provider or content provider) that is communicatively coupled to transceiver 550, which may facilitate communication with wireless receiver devices 580 through network(s) 510-2. Processor 590 may also communicate with video content source 570 storing content data via network(s) 510-1.

Processor 590 may include a number of processing modules such as video transmission module 596 and QoE module 598. Video content data 592 retrieved from video content source 570 via network(s) 510-1 may be provided to video transmission module 596 for transmission to receiver devices 580. QoE module 598 may perform QoE computations based on received portions of the transmitted data (e.g., by comparing selected frames with reference frames) and store quality control data 594 in memory 591 for adjustment of transmission parameters (to enhance transmitted video quality). Video content data 592 and quality control data 594 may be stored during processing in memory 591, which may be a cache memory of the processor 590 or in an external memory (e.g., memory external to processor 590). Processor 590 may also be communicatively coupled to data stores 560, where at least some of the data may be stored.

Figure 6:
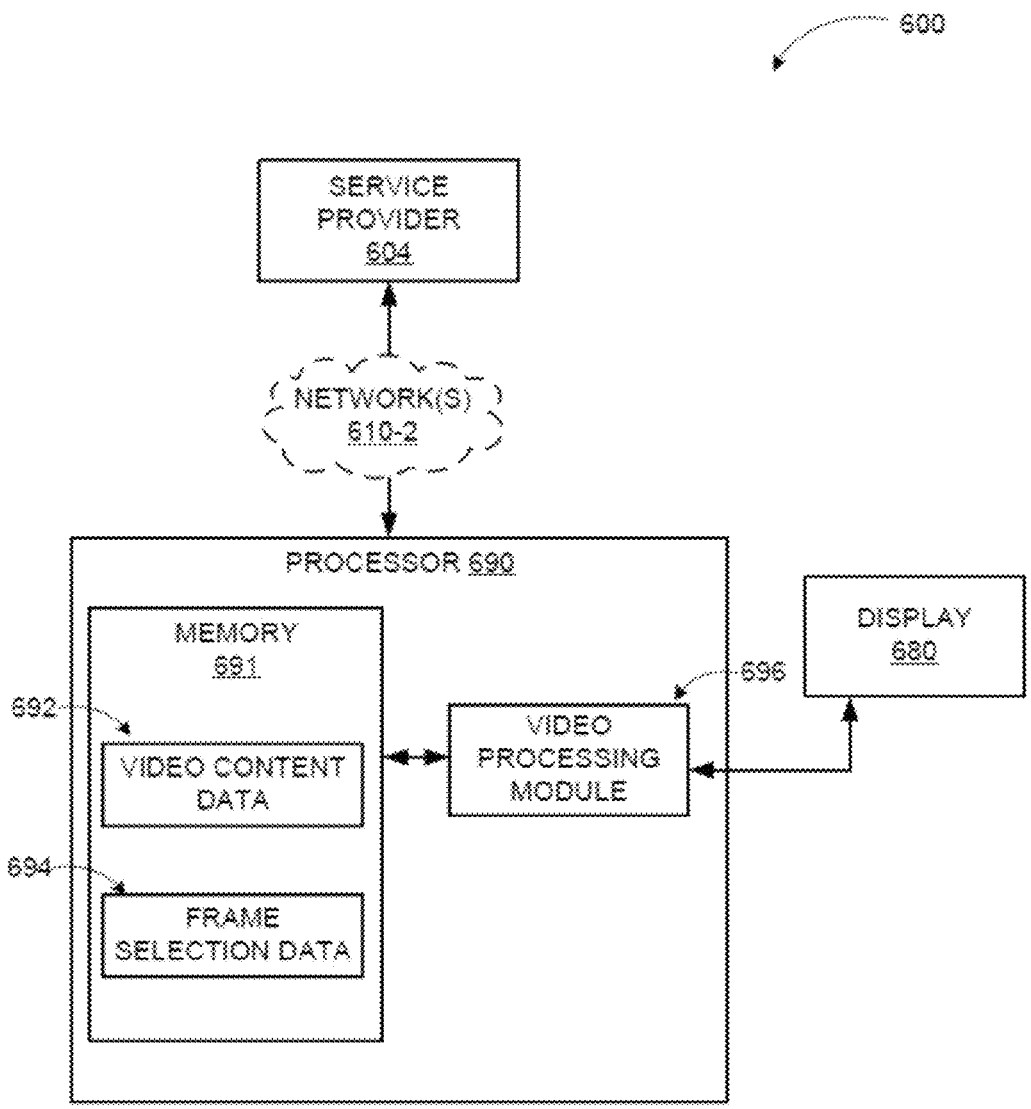
FIG. 6 illustrates a special purpose processor, which may be used in a user device for enabling full-reference computation of QoE at a service provider for wireless video transmission.

FIG. 6 illustrates a special purpose processor, which may be used in a user device for enabling full-reference computation of QoE at a service provider for wireless video transmission, arranged in accordance with at least some embodiments described herein. Processor 690 in diagram 600 may be part of a computing device (e.g., a mobile user device) that is communicatively coupled to service provider 604 through network(s) 610-2 and receive video content from service provider 604 Processor 690 may also control display 680 presenting received video content to a user.

Processor 690 may include a number of processing modules such as video processing module 696. Video content data 692 received from service provider 604 via network(s) 610-2 may be provided to video processing module 696 for transmission to display 680. Video processing module 696 may also select frames for QoE computations, which may be transmitted to service provider 604 by processor 690. Video content data 692 and frame selection data 694 may be stored during processing in memory 691, which may be a cache memory of the processor 690 or in an external memory (e.g., memory external to processor 690).

While FIGS. 5 and 6 are described using video content as example for QoE computation, the principles described herein apply to audio and similar content as wed. Moreover, tasks performed by processor 590 and 690 may be shared among processors of servers for service providers and/or content providers, and processors of user devices in various combinations.

Example embodiments may also include methods. These methods can be implemented in any number of ways, including the structures described herein. One such way is by machine operations, of devices of the type described in the present disclosure. Another optional way is for one or more of the individual operations of the methods to be performed in conjunction with one or more human operators performing some of the operations while other operations are performed by machines. These human operators need not be collocated with each other, but each can be only with a machine that performs a portion of the program. In other examples, the human interaction can be automated such as by pre-selected criteria that are machine automated.

Figure 7:
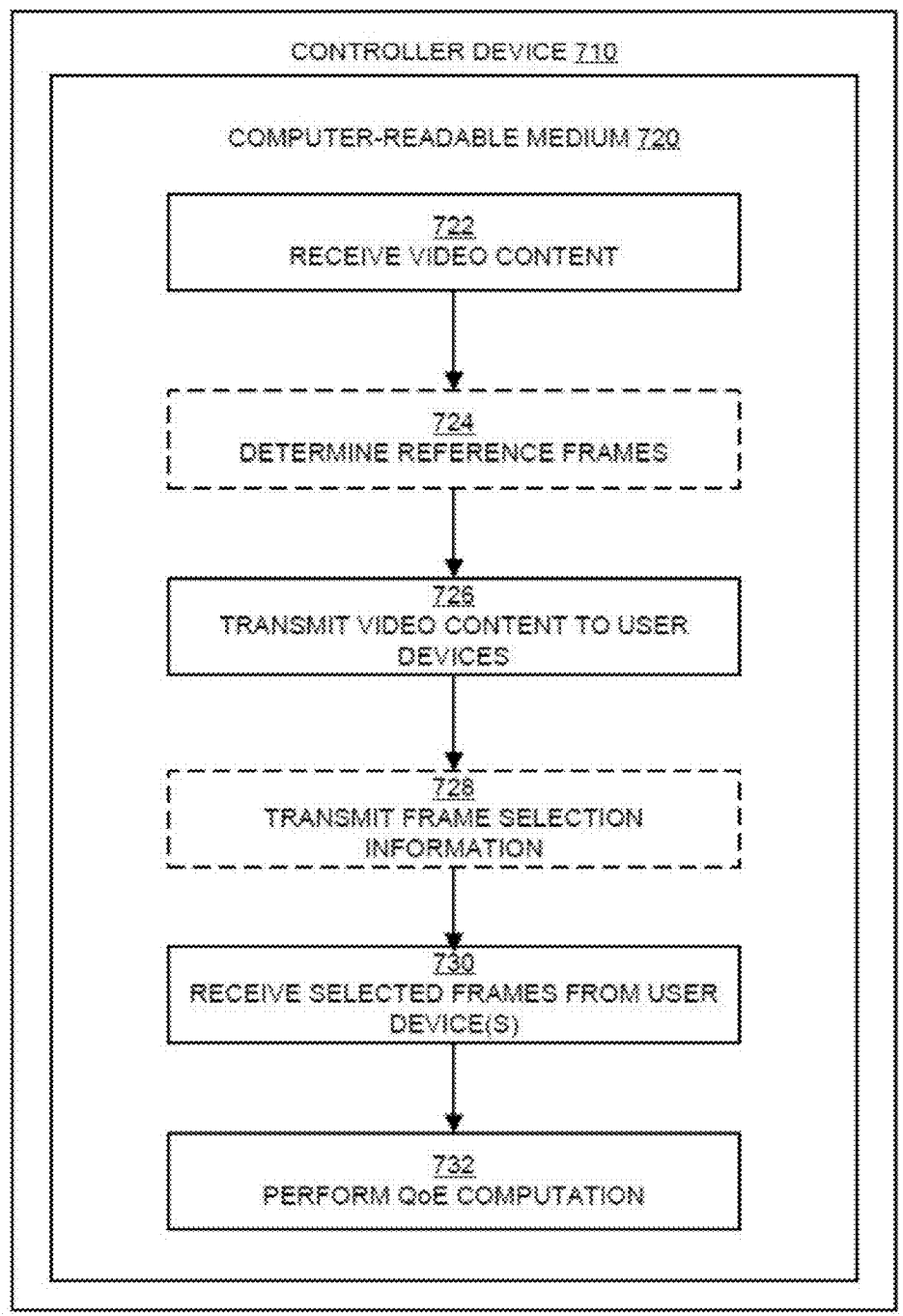
FIG. 7 is a flow diagram illustrating an example method for employing full-reference computation of QoE at a service provider for wireless video transmission that may be performed by a computing device such as device 400 in FIG. 4 or a special purpose processor such as processor 590 of FIG. 5.

FIG. 7 is a flow diagram illustrating an example method for employing full-reference computation of QoE at a service provider for wireless video transmission that may be performed by a computing device such as device 400 in FIG. 4 or a special purpose processor such as processor 590 of FIG. 5, arranged in accordance with at least some embodiments described herein. Thus, controller device 710 may be processor 590 of FIG. 5 or computing device 400 of FIG. 4. Computer-readable medium 720 may store instructions associated with the example method to be executed by the controller device 710.

An example process according to embodiments may begin with operation 722, "RECEIVE VIDEO CONTENT", where a service provider may receive video content from a content provider for transmission to user devices. Operation 722 may be followed by optional operation 724, "DETERMINE REFERENCE FRAMES". where service provider may select reference frames (unimpaired) at periodic intervals or based on a predefined algorithm. Optional operation 724 may be followed by operation 726, "TRANSMIT VIDEO CONTENT TO USER DEVICES", where the service provider may transmit the received video content to user devices over one or more wireless networks.

Operation 726 may be followed by optional operation 728, "TRANSMIT FRAME SELECTION INFORMATION", where the service provider may also transmit selected frame information to the user devices, for example, by marking the frames. At subsequent operation 730, "RECEIVE SELECTED FRAMES FROM USER DEVICE(S)", the service provider may receive the selected frames from the user device(s) as received by the user device(s) (impaired). Operation 730 may be followed by operation 732, "PERFORM QoE COMPUTATION", where the service provider may perform QoE computations based on the received frames and optionally adjust transmission parameters to enhance transmitted video quality.

Figure 8:
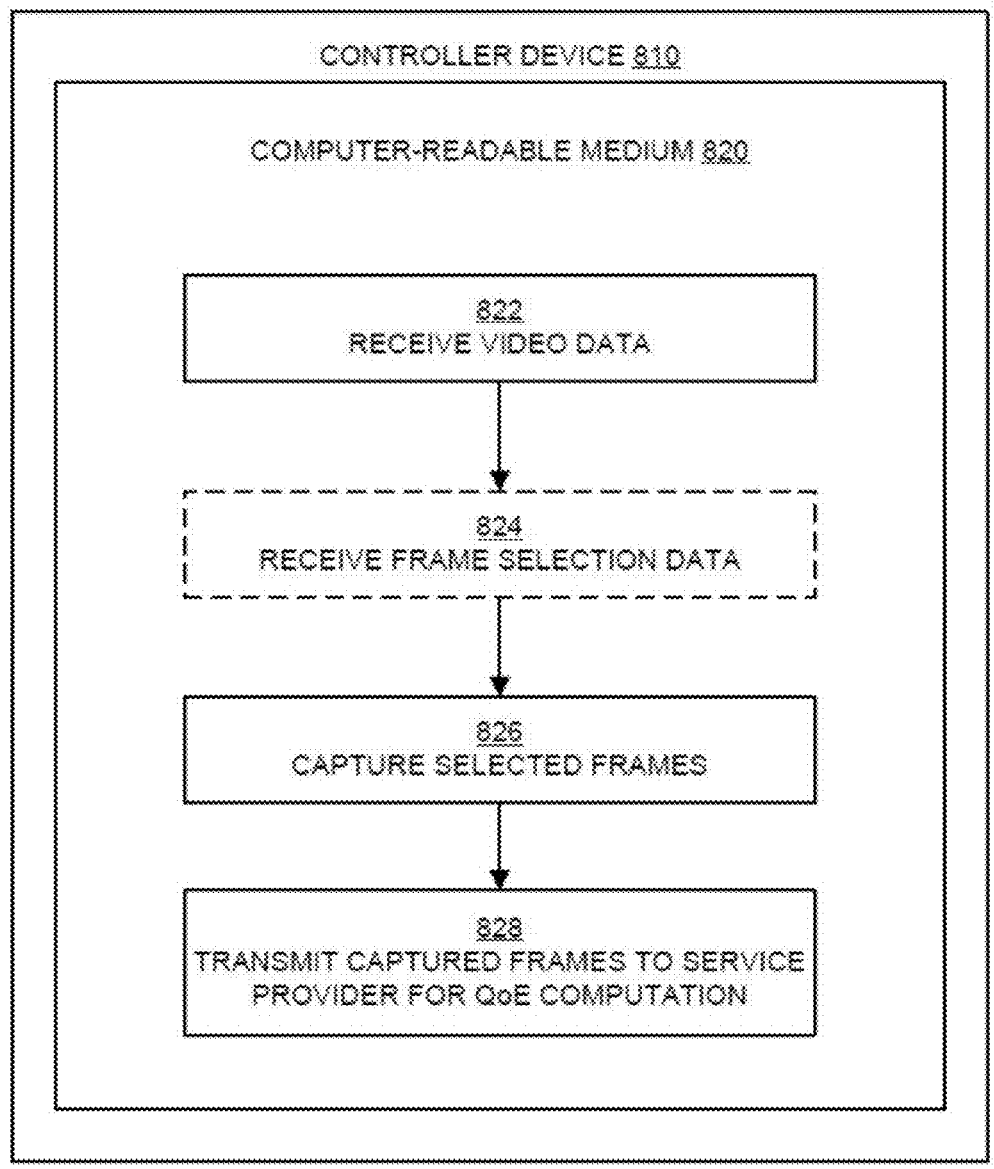
FIG. 8 is a flow diagram illustrating an example method for enabling full-reference computation of QoE at a service provider for wireless video transmission that may be performed by a user computing device incorporating a special purpose processor such as processor 690 of FIG. 6.

FIG. 8 is a flow diagram illustrating an example method for enabling full-reference computation of QoE at a service provider for wireless video transmission that may be performed by a user computing device incorporating a special purpose processor such as processor 690 of FIG. 6, arranged in accordance with at least some embodiments described herein. Thus, controller device 810 may be processor 690 executing instructions stored on computer-readable medium 820 for receiving and displaying video content.

An example process according to embodiments may begin with operation 822, "RECEIVE VIDEO DATA", where the user device may receive video data from a service provider through a wireless network. Operation 822 may be followed by optional operation 824, "RECEIVE FRAME SELECTION DATA", where the user device may also receive indication of selected frames for transmitting back to the service provider for QoE computations. Optional operation 824 may be followed by operation 826, "CAPTURE SELECTED FRAMES", where the user device may capture the selected frames for transmission to the service provider. According to some embodiments, the user device may select and capture the frames without input from the service provider. Operation 826 may be followed by operation 828, "TRANSMIT CAPTURED FRAMES TO SERVICE PROVIDER FOR QoE COMPUTATION", where the user device may transmit the captured frames to the service provider such that QoE computations can be performed based on the selected frames and transmission parameters optionally adjusted to enhance transmitted video quality.

The operations included in the processes of FIG. 7 and FIG. 8 described above are for illustration purposes. Full-reference QoE computation for wirelessly transmitted content may be implemented by similar processes with fewer or additional operations. In some examples, the operations may be performed in a different order. In some other examples, various operations may be eliminated. In still other examples, various operations may be divided into additional operations, or combined together into fewer operations. Although illustrated as sequentially ordered operations, in some implementations the various operations may be performed in a different order, or in some cases various operations may be performed at substantially the same time.

Figure 9:
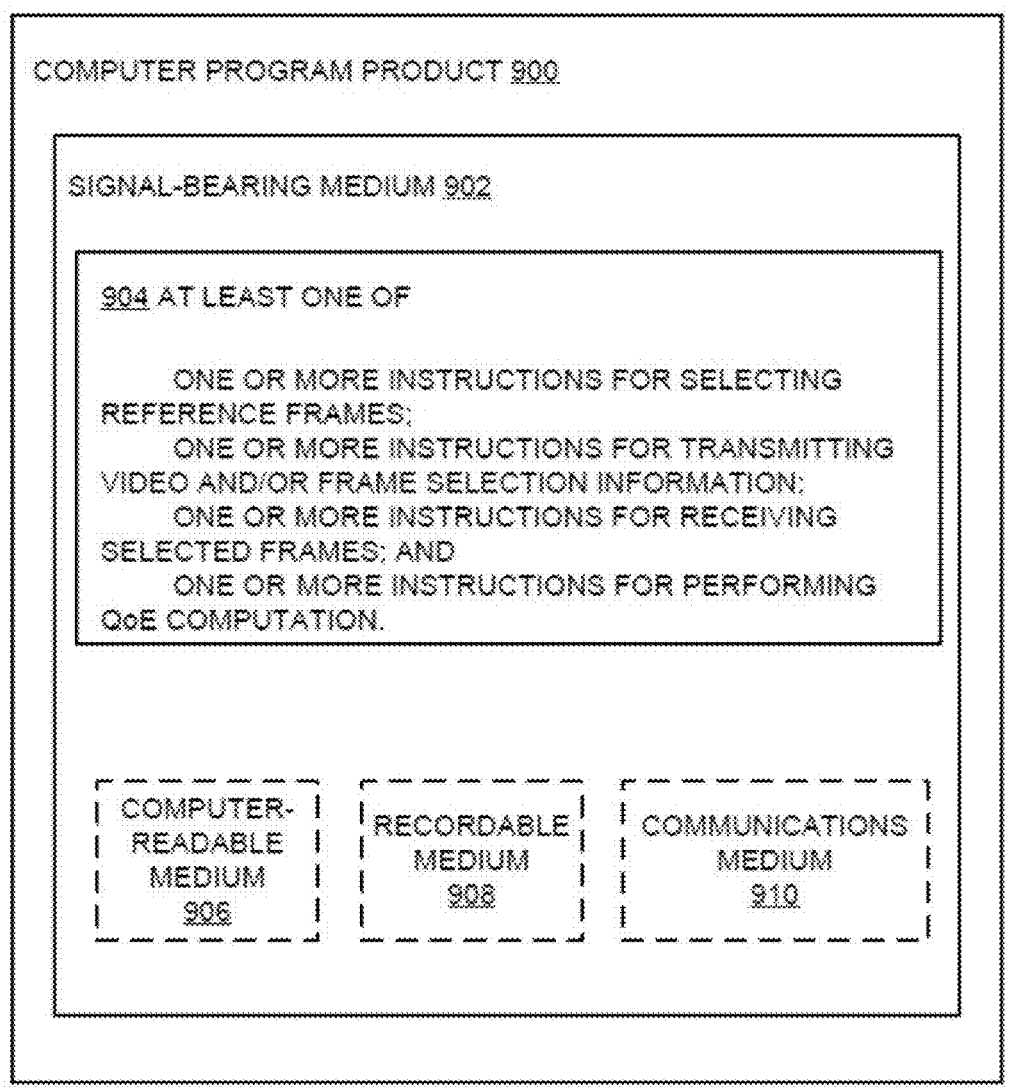
FIG. 9 illustrates a block diagram of an example computer program product to be used by a server of a wireless video transmission service.

FIG. 9 illustrates a block diagram of an example computer program product to be used by a server of a wireless video transmission service, arranged in accordance with at least some embodiments described herein.

In some examples, as shown in FIG. 9, computer program product 900 may include a signal bearing medium 902 that may also include machine readable instructions 904 that, when executed by, for example, a processor, may provide the functionality described above with respect to FIG. 1 through FIG. 3. Thus, for example, referring to processor 590, one or more of the tasks shown in FIG. 9 may be undertaken in response to instructions 904 conveyed to the processor 590 by medium 902 to perform actions associated with computation of mobile content quality of experience in real-time as described herein. Some of those instructions may include selecting reference frames, transmitting video and/or frame selection information, receiving selected frames, and performing QoE computation as described previously.

In some implementations, signal bearing medium 902 depicted in FIG. 9 may encompass a computer-readable medium 906, such as, but not limited to, a hard disk drive, a Compact Disc (CD), a Digital Versatile Disk (DVD), a digital tape, memory, etc. In some implementations, signal bearing medium 902 may encompass a recordable medium 908, such as, but not limited to, memory, read/write (R/W) CDs, RAN DVDs, etc. In some implementations, signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, computer program product 900 may be conveyed to the processor 590 by an RF signal bearing medium 902, where the signal bearing medium 902 is conveyed by a wireless communications medium 910 (e.g., a wireless communications medium conforming with the IEEE 802.11 standard).

Figure 10:
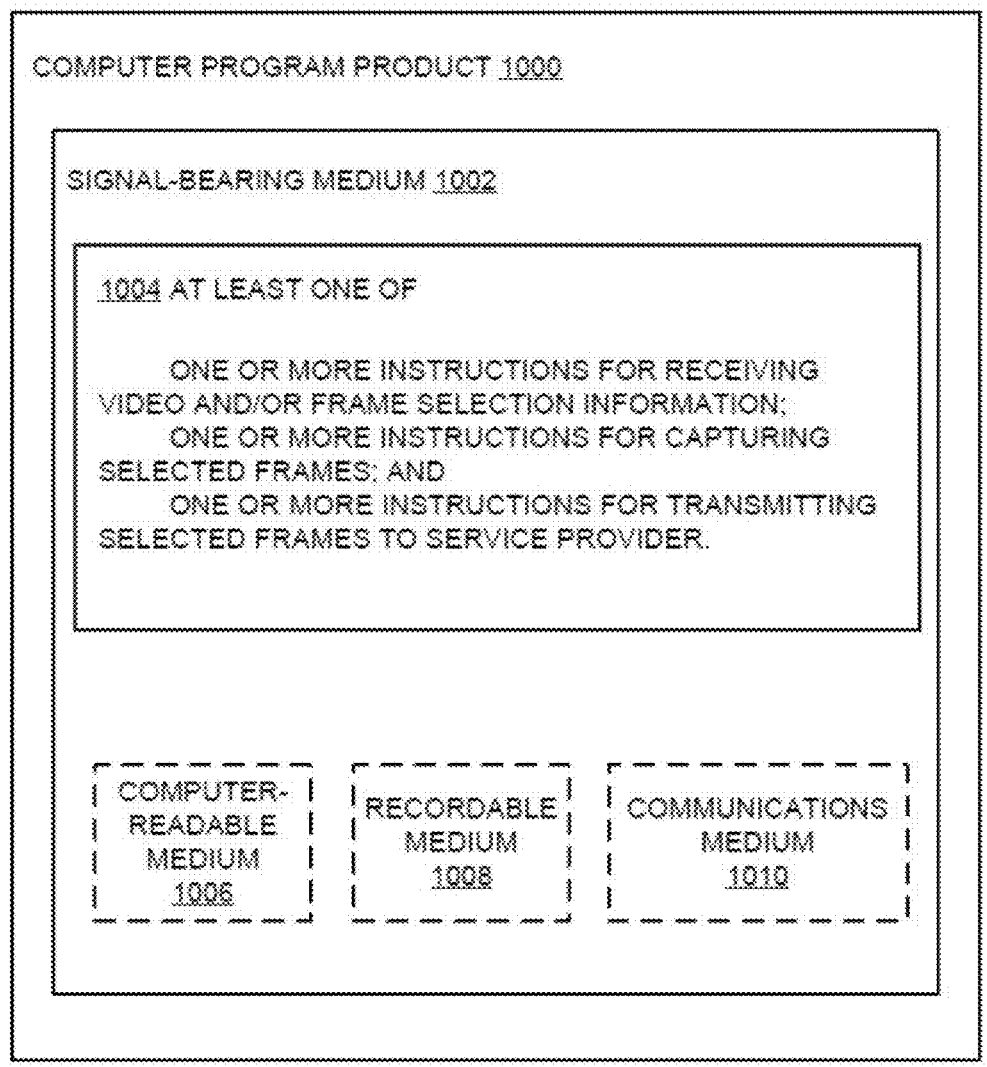
FIG. 10 illustrates a block diagram of an example computer program product to be used by a user device of a wireless video transmission service, all arranged in accordance with at least some embodiments described herein.

FIG. 10 illustrates a block diagram of an example computer program product to be used by a user device of a wireless video transmission service, arranged in accordance with at least some embodiments described herein.

In some examples, as shown in FIG. 10, computer program product 1000 may include a signal bearing medium 1002 that may also include machine readable instructions 1004 that, when executed by, for example, a processor, may provide the functionality described above with respect to FIG. 1 through FIG. 3. Thus, for example, referring to processor 690, one or more of the tasks shown in FIG. 10 may be undertaken in response to instructions 1004 conveyed to the processor 690 by medium 1002 to perform actions associated with mobile content QoE computation in real-time as described herein. Some of those instructions may include receiving video and/or frame selection information, capturing selected frames, and transmitting selected frames to service provider as described previously.

In some implementations, signal bearing medium 1002 depicted in FIG. 10 may encompass a computer-readable medium 1006, such as, but not limited to, a hard disk drive, a Compact Disc (CD), a Digital Versatile Disk (DVD), a digital tape, memory, etc. In some implementations, signal bearing medium 1002 may encompass a recordable medium 1008, such as, but not limited to, memory, read/write (R/W) CDs, RAN DVDs, etc. In some implementations. signal bearing medium 1002 may encompass a communications medium 1010, such as, but not limited to, a digital and/or an analog communication medium (e.g., a fiber optic cable, a waveguide, a wired communications link, a wireless communication link, etc.). Thus, for example, computer program product 1000 may be conveyed to the processor 1004 by an RF signal bearing medium 1002, where the signal bearing medium 1002 is conveyed by a wireless communications medium 1010 (e.g., a wireless communications medium conforming with the IEEE 802.11 standard).

While FIGS. 9 and 10 are described using video content as example for QoE computation, the principles described herein apply to audio and similar content as well. Moreover, tasks performed in response to the instructions may be shared among service providers, content providers, and user devices in various combinations.

According to some examples, the present disclosure describes a method for quiet period management in secondary networks. The method may include determining quality of experience (QoE). The method may include transmitting data to be played back at one or more user devices, receiving one or more selected portions of the transmitted data from a user device, and performing QoE computation using the received portions of the transmitted data. The data may be video data and/or audio data.

According to other examples, the method may also include determining which portions of the transmitted data are to be selected, transmitting information associated with the portions of the transmitted data to be selected to the one or more user devices, and/or using the portions of the transmitted data to be selected as reference data portions to perform the QoE computation by comparing the reference portions with the received portions of the transmitted data. The selected portions and the reference portions of the transmitted data may be video frames, and transmitting information associated with the portions of the transmitted data to be selected may include marking the video frames to be selected by the user device.

According to further examples, the method may further include receiving the selected portions of the transmitted data through an upload channel and adjusting one or more quality of service (QoS) parameters based on the QoE computation in real time. The method may also include increasing an available bandwidth for the upload channel at one or more periods of non-peak data transmission by decreasing an available bandwidth for a download channel, where periods of non-peak data transmission include one or more of an advertisement break and a program break.

According to yet other examples, the method may also include adjusting one or more future quality of service (QoS) parameters based on the QoE computation, receiving the selected portions of the transmitted data during one or more quiet periods, and storing the received portions of the transmitted data for subsequent QoE computation. The quiet periods may include low bandwidth demand periods. The QoE computation may include comparing each pixel of an unimpaired reference frame of a portion of the transmitted data with each pixel of a corresponding frame of the received portion of the transmitted data, and the method may further include performing at least one of spatial and/or temporal alignment between the unimpaired reference frame and the corresponding frame. Results of the QoE computation may be correlated with one or more of instantaneous QoS parameters, a location of the user device, a mobility of the user device, a signal strength at the user device, available memory at the user device, a processing capacity of the user device, and/or load on communication network, where the QoE computations are performed at one of a service provider transmitting the data or a content provider providing the data to the service provider.

According to other examples, the present disclosure describes another method for enabling computation of quality of experience (QoE) in a wireless system. The other method may include receiving data to be played back, determining a portion of the received data to be transmitted to one of a service provider or content provider for QoE computation, capturing the portion of the data to be transmitted to one of the service provider or content provider, and transmitting the portion of the data to one of the service provider or content provider. The data according to the other method may also include video data and/or audio data. The other method may further include receiving information associated with which portions of the received data to be selected from one of the service provider or content provider, where the selected portions of the received data are video frames and the information associated with the portions of the received data to be selected includes video frames marked by one of the service provider or content provider. According to further examples, the selected portions of the received data are video frames and the video frames of the received data to be transmitted to one of the service provider or content provider may be selected at a user device.

According to yet other examples, the other method may include transmitting identifiers of the selected video frames to one of the service provider or content provider such that reference frames for QoE computation are determined at one of the service provider or content provider, where the video frames are selected based on one or more of an upload channel availability, a location of the user device, a mobility of the user device, a signal strength at the user device, available memory at the user device, and/or a processing capacity of the user device. If sufficient bandwidth is available to transmit the selected video frames through the upload channel, a largest possible number of video frames that can be reliably transmitted may be transmitted for real time QoE computation at one of the service provider or content provider. If sufficient bandwidth is not available to transmit the selected video frames, the selected video frames may be transmitted during one of a quiet period or a non-peak period for subsequent QoE computation at one of the service provider or content provider.

According to further examples, the other method may also include selecting the video frames at periodic intervals, transmitting the selected portions of the received data through one of a dedicated upload channel and a shared channel, performing QoE computation by comparing the portion of the received data and test data, and/or transmitting QoE computation results to one of the service provider or content provider. The portion of the received data to be used for QoE computation may include one or more video frames, and the method may further include transmitting identifiers of the one or more video frames to one of the service provider or content provider, and receiving corresponding test video frames. The QoE computations may be performed at one of one of the service provider or content provider or a content provider providing the data to one of the service provider or content provider.

According to yet other examples, the present disclosure describes a server providing an audio/video transmission service with quality of experience (QoE) computation over a wireless network. The server may include a communication module adapted to communicate wirelessly with one or more user devices, a memory adapted to store instructions, and a processor coupled to the communication module and the memory. The processor may be adapted to transmit data to be played back at one or more user devices, receive one or more selected portions of the transmitted data from a user device and perform QoE computation based on the received portions of the transmitted data. The data may be video data and/or audio data.

According to further examples, the processor of the server may determine which portions of the transmitted data are to be selected, transmit information associated with the portions of the transmitted data to be selected to the one or more user devices, and/or use the portions of the transmitted data to be selected as reference data portions to perform the QoE computation by comparing the reference portions with the received portions of the transmitted data. According to some examples, the selected portions and the reference portions of the transmitted data may be video frames, and the processor may transmit information associated with the portions of the transmitted data to be selected by marking the video frames to be selected by the user device.

According to other examples, the processor of the server may receive the selected portions of the transmitted data through an upload channel, adjust one or more quality of service (QoS) parameters based on the QoE computation in real time, increase an available bandwidth for the upload channel at one or more periods of non-peak video data transmission by decreasing an available bandwidth for a download channel, receive the selected portions of the transmitted data during one or more quiet periods, and/or store the received portions of the transmitted data for subsequent QoE computation.

The processor of the server may also adjust one or more quality of service (QoS) parameters based on the subsequent QoE computation, where the quiet periods include low bandwidth demand periods. The processor may further compare each pixel of an unimpaired reference frame of a portion of the transmitted data with each pixel of a corresponding frame of the received portion of the transmitted data. The server may be part of one of a service provider transmitting the data or a content provider providing the data to the service provider. The processor may also correlate results of the QoE computation with one or more of instantaneous QoS parameters, a location of the user device, a mobility of the user device, a signal strength at the user device, available memory at the user device, a processing capacity of the user device, and/or load on communication network.

According to further examples, the present disclosure describes a computing device for receiving an audio/video transmission service with quality of experience (QoE) computation over a wireless network. The computing device may include a memory adapted to store instructions; and a processor coupled to the communication module and the memory. The processor may be adapted to receive data to be played back, determine a portion of the received data to be transmitted to the service provider for QoE computation, capture the portion of the data to be transmitted to the service provider, and transmit the portion of the data to the service provider. The data may be video data and/or audio data.

The processor of the computing device may receive information associated with which portions of the received data to be selected from the service provider, where the selected portions of the received data are video frames and the information associated with the portions of the received data to be selected includes video frames marked by the service provider. The selected portions of the received data are video frames and the video frames of the received data to be transmitted to the service provider may also be selected at the computing device.

The processor of the computing device may further be adapted to transmit identifiers of the selected video frames to the service provider such that reference frames for QoE computation are determined at the service provider, where the video frames are selected based on one or more of an upload channel availability, a location of the computing device, a mobility of the computing device, a signal strength at the computing device, available memory at the computing device, and/or a processing capacity of the user device.

If sufficient bandwidth is available to transmit the selected video frames through the upload channel, a largest possible number of video frames that can be reliably transmitted may be transmitted for real time QoE computation at the service provider. If sufficient bandwidth is not available to transmit the selected video frames, the selected video frames may be transmitted during one of a quiet period or a non-peak period for subsequent QoE computation at the service provider. The processor may also select the video frames at periodic intervals. The computing device may be one of a desktop computer, a handheld computer, a vehicle-mount computer, a smart phone, or a portable television.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount. the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., 'a' and/or "an" should be interpreted to mean "at least one" or "one or more"), the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to determine quality of experience (QoE) in a wireless system, the method comprising:
   transmitting, by one of a service provider or a content provider, data to a user device, wherein the transmitted data is played back at the user device;
   in response to a determination that sufficient bandwidth is available to receive one or more selected portions of the transmitted data from the user device through an upload channel,
      receiving the one or more selected portions of the transmitted data that can be reliably received for real time QoE computation from the user device at one of the service provider or the content provider, wherein the one or more selected portions are selected on periodic intervals or based on a predefined algorithm on the user device;
   in response to a determination that data upload and data download is shared through a same channel,
      receiving the one or more selected portions of the transmitted data from the user device at a non-peak data transmission time period for the real time QoE computation at one of the service provider or the content provider such that additional bandwidth is released for upload purposes by downgrading a quality of transmissions;
   performing, by one of the service provider or the content provider, the QoE computation using the one or more selected portions of the transmitted data;
   performing, b one of the service provider or the content provider at least one of spatial and/or temporal alignment between an unimpaired reference frame of the one or more selected portions of the transmitted data and a corresponding frame of received portions of the transmitted data and
   transmitting, by one of the service provider or the content provider, QoE computation results to a data store to subsequently analyze the QoE computation results and adjust QoE parameters based on the subsequent analysis of the QoE computation results.

2. The method according to claim 1, further comprising one or more of:
   determining, by one of the service provider or the content provider, the one or more selected portions of the transmitted data;
   transmitting, by one of the service provider or the content provider, information associated with the one or more selected portions of the transmitted data to the user device; and
   using the one or more selected portions of the transmitted data to perform the QoE computation at one of the service provider or the content provider by comparing reference data portions of the transmitted data with the received portions of the transmitted data, wherein the transmitted data includes at least one of video data and/or audio data.

3. The method according to claim 2, wherein the reference data portions of the transmitted data are video frames, and wherein transmitting information associated with the reference data portions of the transmitted data includes marking the video frames to be selected by the user device.

4. The method according to claim 2, further comprising:
   adjusting, by one of the service provider or the content provider, one or more quality of service (QoS) parameters based on the QoE computation in real time.

5. The method according to claim 2, further comprising:
   adjusting, by one of the service provider or the content provider, one or more future quality of service (QoS) parameters based on the QoE computation.

6. The method according to claim 2, further comprising:
   receiving at one of the service provider or the content provider the one or more selected portions of the transmitted data during one or more quiet periods; and
   storing at one of the service provider or the content provider the received portions of the transmitted data for subsequent QoE computation, wherein the quiet periods include low bandwidth demand periods.

7. The method according to claim 2, wherein the QoE computation includes comparing each pixel of an unimpaired reference frame of the one or more selected portions of the transmitted data with each pixel of the corresponding frame of the received portions of the transmitted data.

8. The method according to claim 2, further comprising:
   correlating results of the QoE computation with one or more of instantaneous QoS parameters, a location of the user device, a mobility of the user device, a signal strength at the user device, available memory at the user device, a processing capacity of the user device, and/or a load on communication network.

9. A method to enable computation of quality of experience (QoE) in a wireless system, the method comprising:
   receiving data from one of a service provider and a content provider to be played back at a user device;
   determining, by the user device, one or more selected portions of the received data to be transmitted to one of the service provider or the content provider for QoE computation;
   capturing, by the user device, the one or more selected portions of the data to be transmitted to one of the service provider or the content provider;
   in response to a determination that sufficient bandwidth is available to transmit the one or more selected portions of the received data including at least one of video data and/or audio data through an upload channel, transmitting, by the user device, a largest possible portion of the received data to the service provider that can be reliably transmitted for real time QoE computation at one of the service provider or the content provider, wherein the one or more selected portions are selected on periodic intervals or based on a predefined algorithm on the user device; and
   in response to a determination that data upload and data download is shared through a same channel, transmitting, by the user device, the one or more selected portions of the received data at a non-peak data transmission time period for the real time QoE computation to one of the service provider or the content provider such that additional bandwidth is released for upload purposes by downgrading a quality of transmissions, wherein one of the service provider or the content provider is configured to:
  perform at least one of spatial and/or temporal alignment between an unimpaired reference frame of the one or more selected portions of the received data received from one of the service provider and the content provider at the user device and a corresponding frame of the one or more selected portions of the received data transmitted from the user device to one of the service provider or the content provider; and
  transmit QoE computation results to a data store to subsequently analyze the QoE computation results and adjust QoE parameters based on the subsequent analysis of the QoE computation results.

10. The method according to claim 9, further comprising: receiving information associated with the one or more selected portions of the received data from one of the service provider or the content provider at the user device, wherein the one or more selected portions of the received data are video frames and, wherein the information associated with the one or more selected portions of the received data includes the video frames marked by one of the service provider or the content provider.

11. The method according to claim 9, wherein the one or more selected portions of the received data includes video frames and, wherein the video frames of the one or more selected portions of the received data are selected at the user device to be transmitted to one of the service provider or the content provider.

12. The method according to claim 11, further comprising: transmitting, by the user device, identifiers of the video frames of the one or more selected portions of the received data to one of the service provider or the content provider such that reference frames for QoE computation are determined at one of the service provider or the content provider, wherein the video frames are selected based on one or more of an upload channel availability, a location of the user device, a mobility of the user device, a signal strength at the user device, available memory at the user device, and/or a processing capacity of the user device.

13. A server providing an audio/video transmission service with quality of experience (QoE) computation over a wireless network, the server comprising:
  a communication module adapted to communicate wirelessly with a user device;
  a memory adapted to store instructions; and
  a processor coupled to the communication module and the memory, the processor adapted to:
    transmit data to the user device, wherein the transmitted data is played back at the user device;
    in response to a determination that sufficient bandwidth is available to receive one or more selected portions of the transmitted data from the user device, receive a largest amount of the one or more selected portions of the transmitted data that can be reliably received for real time QoE computation at one of a service provider or a content provider, wherein the one or more selected portions are selected on periodic intervals or based on a predefined algorithm on the user device;
    in response to a determination that data upload and data download is shared through a same channel, receive the one or more selected portions of the transmitted data from the user device at a non-peak data transmission time period for the real time QoE computation at one of the service provider or the content provider such that additional bandwidth is released for upload purposes by downgrading a quality of transmissions;
    perform the QoE computation based on the one or more selected portions of the transmitted data at one of the service provider or the content provider, wherein the transmitted data includes at least one of video data and/or audio data;
    perform at least one of spatial and/or temporal alignment between an unimpaired reference frame of the one or more selected portions of the transmitted data and a corresponding frame of received portions of the transmitted data at one or more of the service provider or the content provider; and
    transmit, by one of the service provider or the content provider, QoE computation results to a data store to subsequently analyze the QoE computation results and adjust QoE parameters based on the subsequent analysis of the QoE computation results.

14. The server according to claim 13, wherein the processor is further adapted to one or more of:
  determine the one or more selected portions of the transmitted data at one of the service provider or the content provider;
  transmit information associated with the one or more selected portions of the transmitted data from one of the service provider or the content provider to the user device;
  use the one or more selected portions of the transmitted data to perform the QoE computation at one of the service provider or the content provider by comparing reference data portions of the transmitted data with the received portions of the transmitted data;
  transmit information from one of the service provider or the content provider associated with the reference data portions of the transmitted data to be selected by marking video frames to be selected by the user device, wherein the reference data portions of the transmitted data are the video frames;
  receive, from the user device, the one or more selected portions of the transmitted data through an upload channel; and
  adjust one or more quality of service (QoS) parameters at one of the service provider or the content provider based on the QoE computation in real time.

15. The server according to claim 14, wherein the processor is further adapted to one or more of:
  receive, at one of the service provider or the content provider, the one or more selected portions of the transmitted data from the user device during the non-peak data transmission time period;
  store, at one of the service provider or the content provider, the received portions of the transmitted data for subsequent QoE computation; and
  adjust, at one of the service provider or the content provider, one or more future quality of service (QoS) parameters based on the subsequent QoE computation.

16. The server according to claim 13, wherein the processor is further adapted to:
  compare, at one of the service provider or the content provider, each pixel of an unimpaired reference frame of a portion of the transmitted data with each pixel of a corresponding frame of the received portions of the transmitted data.

17. The server according to claim 13, wherein the processor is further adapted to:
  correlate, at one of the service provider or the content provider, results of the QoE computation with one or more of instantaneous QoS parameters, a location of the user device, a mobility of the user device, a signal strength at the user device, available memory at the user device, a processing capacity of the user device, and/or a load on communication network.

18. A computing device for receiving an audio/video transmission service with quality of experience (QoE) computation over a wireless network, the computing device comprising:
 a communication module adapted to communicate wirelessly with a service provider;
 a memory adapted to store instructions;
 a processor coupled to the communication module and the memory, the processor adapted to:
  receive data from the service provider to be played back at a user device;
  determine one or more selected portions of the received data to be transmitted from the user device to the service provider for QoE computation;
  capture the one or more selected portions of the received data to be transmitted to the service provider at the user device;
  in response to a determination that sufficient bandwidth is available to transmit the one or more selected portions of the received data that includes at least one of video data and/or audio data from the user device through an upload channel, transmit a largest possible portion of the received data from the user device to the service provider that can be reliably transmitted for the QoE computation at one of the service provider or a content provider, wherein the one or more selected portions are selected on periodic intervals or based on a predefined algorithm;
  in response to a determination that data upload and data download is shared through a same channel, transmit the one or more selected portions of the received data from the user device to the service provider at a non-peak data transmission time period for the QoE computation at one of the service provider or the content provider such that additional bandwidth is released for upload purposes by downgrading a quality of transmissions, wherein one of the service provider or the content provider is configured to:
   perform at least one of spatial and/or temporal alignment between an unimpaired reference frame of the one or more selected portions of the received data received from one of the service provider and the content provider at the user device and a corresponding frame of one or more selected portions of the received data transmitted from the user device to one of the service provider or the content provider; and
  transmit, QoE computation results to a data store to subsequently analyze the QoE computation results and adjust QoE parameters based on the subsequent analysis of the QoE computation results.

19. The computing device according to claim 18, wherein the processor is further adapted to:
 receive information associated with the one or more selected portions of the received data selected from the service provider at the user device, wherein the one or more selected portions of the received data includes video frames and the information associated with the one or more selected portions of the received data that includes the video frames marked by the service provider.

20. The computing device according to claim 18, wherein the processor is further adapted to:
 transmit identifiers of video frames from the user device to the service provider such that reference frames for QoE computation are determined at the service provider, and wherein the video frames are selected based on one or more of an upload channel availability, a location of the computing device, a mobility of the computing device, a signal strength at the computing device, available memory at the computing device, and/or a processing capacity of the computing device.

* * * * *

UNITED STATES PATENT AND TRADEMARK OFFICE
CERTIFICATE OF CORRECTION

PATENT NO. : 9,060,191 B2  
APPLICATION NO. : 13/378993  
DATED : June 16, 2015  
INVENTOR(S) : Chhaochharia et al.

It is certified that error appears in the above-identified patent and that said Letters Patent is hereby corrected as shown below:

On the title page

On Page 2, item (56), under "OTHER PUBLICATIONS", in Column 2, Line 13, delete "Aubièere," and insert -- Aubière, --, therefor.

In the specification

In Column 1, Line 9, delete "§371" and insert -- § 371 --, therefor.

In Column 1, Line 10, delete "claims" and insert -- which claims --, therefor.

In Column 1, Line 10, delete "§119" and insert -- § 119 --, therefor.

In Column 4, Line 10, delete "techniques" and insert -- techniques. --, therefor.

In Column 5, Line 7, delete "accounting." and insert -- accounting, --, therefor.

In Column 5, Line 18, delete "algorithm." and insert -- algorithm, --, therefor.

In Column 5, Line 64, delete "systems," and insert -- systems --, therefor.

In Column 6, Line 55, delete "riot" and insert -- not --, therefor.

In Column 8, Line 26, delete "604" and insert -- 604. --, therefor.

In Column 8, Line 42, delete "as wed." and insert -- as well. --, therefor.

In Column 9, Line 9, delete "FRAMES"." and insert -- FRAMES", --, therefor.

Signed and Sealed this  
First Day of December, 2015

Michelle K. Lee  
*Director of the United States Patent and Trademark Office*

CERTIFICATE OF CORRECTION (continued)
U.S. Pat. No. 9,060,191 B2

In the specification

In Column 10, Line 65, delete "RAN" and insert -- R/W --, therefor.

In Column 10, Line 65, delete "implementations." and insert -- implementations, --, therefor.

In Column 14, Line 32, delete "paramount." and insert -- paramount, --, therefor.

In Column 15, Line 8, delete "can, of" and insert -- can of --, therefor.

In Column 16, Line 23, delete "recitations," and insert -- recitations. --, therefor.

In Column 16, Line 32, delete "more")," and insert -- more"); --, therefor.

In the claims

In Column 17, Line 46, in Claim 1, delete "b one" and insert -- by one --, therefor.

In Column 17, Line 47, in Claim 1, delete "provider" and insert -- provider, --, therefor.

In Column 17, Line 51, in Claim 1, delete "data and" and insert -- data; and --, therefor.

In Column 22, Line 14, in Claim 18, delete "transmit," and insert -- transmit --, therefor.